Oct. 19, 1937.   R. R. RABER ET AL   2,096,134
WORK SPINDLE FOR THREAD MILLING MACHINES
Filed June 30, 1936
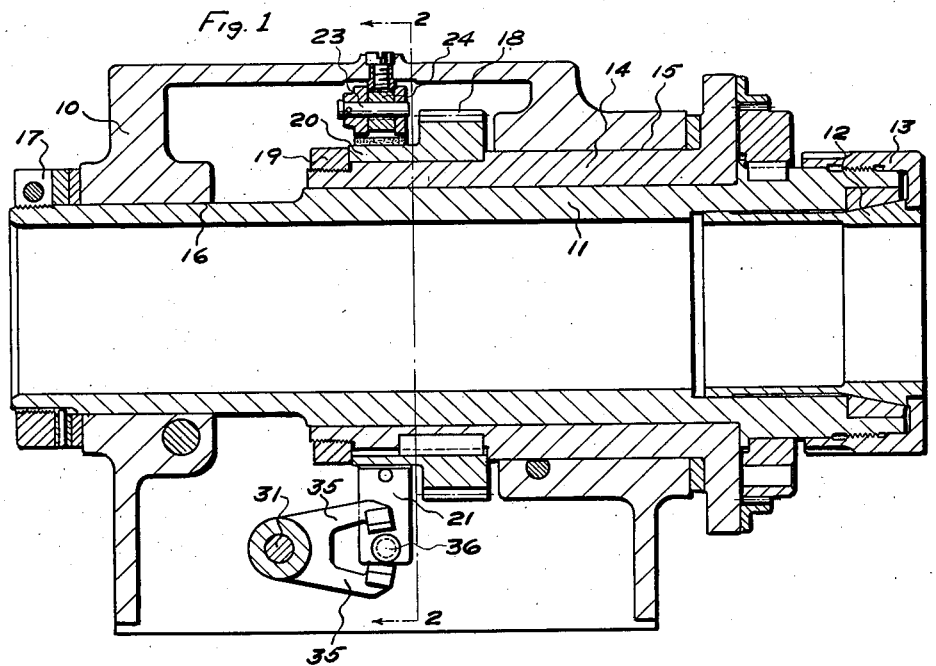
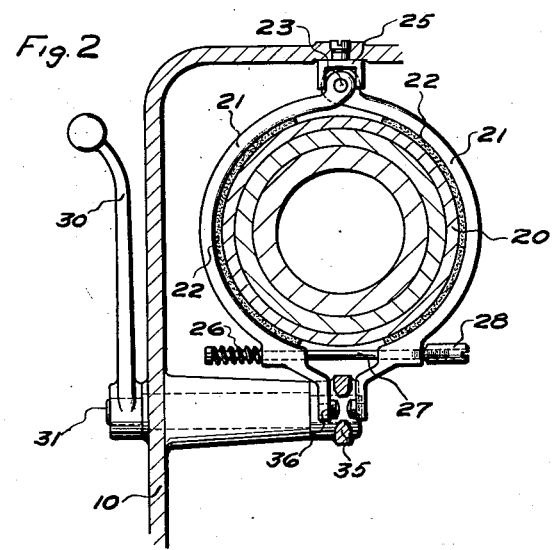
INVENTORS
R. R. RABER
and
F. J. LARSON
BY Joseph K. Schofield
ATTORNEY Patented Oct. 19, 1937

2,096,134

UNITED STATES PATENT OFFICE 2,096,134

WORK SPINDLE FOR THREAD MILLING MACHINES

Robert R. Raber, West Hartford, and Frederick J. Larson, East Hartford, Conn., assignors to Niles-Bement-Pond Company, New York, N. Y., a corporation of New Jersey Application June 30, 1936, Serial No. 88,182

4 Claims. (Cl. 10—154)

This invention relates to thread and other types of milling machines having work rotating spindles and particularly to means for applying a frictional resistance against rotation of the work supporting and rotating spindle during the milling operation and to permit this frictional resistance to be adjusted and applied and released as desired during the operation of the machine.

A primary object of the invention is to apply brake bands surrounding a portion of the work spindle of a thread milling machine, these bands being supported within the headstock of the machine at their pivotal or adjacent ends and having their opposite ends resiliently forced toward each other by suitable spring controlled means, the pressure exerted by the spring means being adjustable over a wide range to apply any desired drag upon the spindle and to eliminate all lost motion during the milling operation.

Another object of the invention is to provide means operated by a controlling lever of the machine to engage and separate the ends of these brake bands to release them from engagement with the work spindle when the operating lever has been moved from its position assumed during the normal or cutting operation of the machine.

And finally it is an object of the invention to support the brake bands for slight lateral adjustment within the headstock so that these bands may fit closely to the spindle and uniformly engage its surface throughout its circumference.

With the above and other objects in view our invention includes the features of construction and operation set forth in the following specification and illustrated in the accompanying drawing.

In the accompanying drawing annexed hereto and forming a part of this specification, we have shown our invention embodied in a form of thread milling machine having an indexable spindle retained within a driving sleeve, but it will be understood that the invention can be otherwise embodied and that the drawing is not to be construed as defining or limiting the scope of the invention, the claims appended to this specification being relied upon for that purpose.

In the drawing:

Figure 1 is a longitudinal sectional view through the axis of the work supporting and rotating spindle.

Fig. 2 is a cross sectional view taken upon the plane of the line 2—2 of Fig. 1.

In the above-mentioned drawing we have shown but one embodiment of the invention which is now deemed preferable, but it is to be understood that changes and modifications may be made within the scope of the appended claims without departing from the spirit of the invention.

Briefly and in its preferred aspect, our invention may include the following principal parts: First, a headstock within which may be longitudinally supported a work rotating spindle having work clamping means at one end; second, a driving sleeve surrounding a portion of the work spindle and adapted for rotation with the spindle in different relative angular or indexed relations thereto; third, a driving gear for rotating the sleeve and spindle preferably keyed directly to the sleeve and having a sleeve-like projection formed thereon; fourth, semi-circular brake bands surrounding the sleeve portion of the driving gear pivoted to each other at one end and flexibly connected to a portion of the headstock for limited vertical adjustment; fifth, means connecting the free ends of the brake bands having a helical spring at one end and a nut threaded upon the bolt at the opposite end so that the brake bands may resiliently engage the driving gear with any desired pressure; and sixth, a controlling lever pivotally mounted and having an arm with spaced oppositely disposed lugs thereon, these lugs adapted to enter a gap between the free ends of the brake bands in oscillated position of the lever so that the brake bands are forcibly separated and disengaged from the surface of the driving gears.

In the operation of thread milling it has been found that better and faster milling together with longer cutter life is obtainable when the work spindle and cutter spindle rotate in opposite directions. The usual practice, however, has been to rotate the spindles in the same direction so that the feed of the work was against or opposite the direction of rotation of the cutter. This was necessary as no means were provided for eliminating lost motion or back lash in the work rotating mechanism. To operate the work and cutter spindles to give the improved results required the work spindle to be entirely free from lost motion to prevent irregular rotation due to the work spindle being subjected to the uneven cutting action. This pressure varied widely in amount and direction so that the spindle would chatter during the milling operation. By placing a constant drag upon the spindle this chattering was prevented during operation. Arrangements had to be made, however, so that this resistance could be released during the setting up of the machine when it would be necessary to rotate the spindle by hand and also it was desirable that this resistance be released while the spindle was being rapidly rotated.

Referring more in detail to the figures of the drawing we provide a headstock 10 forming part of a thread milling machine such as shown in the patent to Blood 1,588,003 or of any other standard type. Rotatably mounted within this headstock is a spindle 11 having work clamping means 12 at one end, those shown being in the form of a collet chuck adapted to be opened and closed by rotation of threaded collar 13 in the usual manner. Surrounding the spindle 11 is a driving sleeve 14 extending a portion of the length of the spindle 11 and directly engaging a bearing surface 15 formed in the headstock 10 within which it rotates. The spindle 11 and driving sleeve 14 are secured together by indexable means permitting angular adjustment for milling multiple screw threads. In operation these members are held in adjusted angular relation to each other and rotate simultaneously together while the milling of a thread is taking place.

Adjacent the opposite end of the spindle 11 there is provided a bearing surface 16 in the headstock 10 through which the spindle passes, there being an adjustable collar 17 outside the headstock 10 threaded upon the spindle 11 and retaining the spindle against axial movement.

To rotate the spindle 11 and its driving sleeve 14 there is keyed to the sleeve a gear 18. As shown in Fig. 1 this gear 18 engages against a shoulder formed on the driving sleeve and is retained axially in position on the spindle 11 by a collar 19 threaded on the end of the driving sleeve and engaging against an end of the gear 18.

Formed on the gear 18 is a sleeve portion 20 having a cylindrical surface adapted to be engaged by the surfaces of yoke members 21. Preferably the yoke members 21 are substantially semi-circular and are lined with suitable material 22 such as moulded brake lining of asbestos or other material to provide substantial frictional engagement with the sleeve portion 20 of the gear 18. At their upper ends the yoke members 21 are pivoted to each other by means of a pin 23, there being a spacing member 24 also mounted on the pin 23 and disposed between the pivoted ends of the yoke members 21. To retain the yoke members 21 against rotation with the spindle 11 and driving sleeve 14 the spacing member 24 is slidable within a saddle member 25 retained in fixed position within the headstock 10. This saddle member 25 engages the spacing member 24 on the pivot or pin 23 for the yoke member 21 upon opposite vertical surfaces so that limited vertical adjustment of the yoke members 21 is permitted while still being retained against rotation.

The opposite or lower ends of the yoke member 21 are extended a short distance below the spindle 11 and are resiliently drawn toward each other into frictional engagement with the surface of the sleeve portion 20 by a spring 26 upon a bolt 27 mounted as shown in Fig. 2. A threaded nut 28 on the end of the bolt 27 opposite the end on which the spring 26 is mounted permits adjustment of the pressure of the yoke members 21 against the surface of the sleeve portion 20.

As above described the engagement of the yoke members 21 frictionally against the surface 20 is required only during the cutting operation and this engagement should be released during the setting up of the machine and during rapid traversing movement of the cutter.

As indicated in Fig. 2, a starting or control lever 30 is pivotally mounted on shaft 31. On this shaft 31 are mounted two arms 35 preferably formed upon a single member keyed to the shaft and having their free ends disposed in opposed relation to each other and positioned between the lower ends of the yoke members 21. In either oscillated position of the arms 35 from their central position shown in Fig. 1 the end of one arm will be forced between the ends of the yoke members 21. Heads 36 may be provided on the members 21 and suitably secured thereto in position to engage the arms 35. When forced between the contacting members or heads 36 either arm 35 will force the yoke members 21 apart and out of contact with the surface 20 so that the spindle 11 may be rotated without friction.

What we claim is:

1. In a thread milling machine in combination, a headstock, a spindle rotatably supported therein, work clamping means thereon, a driving gear on said spindle intermediate the ends thereof, yoke members supported within said headstock and adapted normally to resiliently engage a surface on said spindle, and means to disengage said members from engagement with said surface.

2. In a thread milling machine in combination, a headstock, a spindle rotatably supported therein, work clamping means thereon, a driving gear on said spindle intermediate the ends thereof, yoke members pivotally supported within said headstock and adapted normally to resiliently engage a surface on said spindle, and a lever movable between the free ends of said yoke members whereby said yoke members may be freed from said spindle.

3. In a thread milling machine in combination, a headstock, a spindle rotatably supported therein, work clamping means thereon, a driving gear on said spindle intermediate the ends thereof, yoke members pivotally supported within said headstock and adapted to surround and engage a surface on said spindle, a spring resiliently forcing said yoke members into engagement with said surface, and means interposed between the free ends of said yoke members to disengage said members from said surface.

4. In a thread milling machine in combination, a headstock, a spindle rotatably supported therein, work clamping means thereon, a driving gear on said spindle intermediate the ends thereof, yoke members supported within said headstock and surrounding said spindle, a pivotal connection between adjacent ends of said yoke members, means to support said pivotal connection within said headstock for free movement toward and from said spindle, a spring resiliently forcing said yoke members into engagement with said spindle, and means interposable between the free ends of said yoke members to disengage said members from the spindle.

ROBERT R. RABER.
FREDERICK J. LARSON.